P. N. WOLISTON, A. CAVILEER & W. McCUDDY.
ICE CREAM FREEZER.

No. 60,689. Patented Jan. 1, 1867.

United States Patent Office.

ALFRED CAVILEER, WILLIAM McCUDDY, AND PHILIP N. WOLISTON, OF SPRINGFIELD, OHIO.

Letters Patent No. 60,689, dated January 1, 1867.

IMPROVED ICE-CREAM FREEZER.

The Schedule referred to in these Letters Patent and making part of the same.

TO ALL WHOM IT MAY CONCERN:

Be it known that we, PHILIP N. WOLISTON, ALFRED CAVILEER, and WILLIAM McCUDDY, of Springfield, in the county of Clark, and State of Ohio, have invented a new and improved Freezer for Ice Cream and other substances; and we do hereby declare that the following is a full, clear, and exact description thereof, which will enable others skilled in the art to make and use the same, reference being had to the accompanying drawings forming part of this specification, in which—

Figure 1:
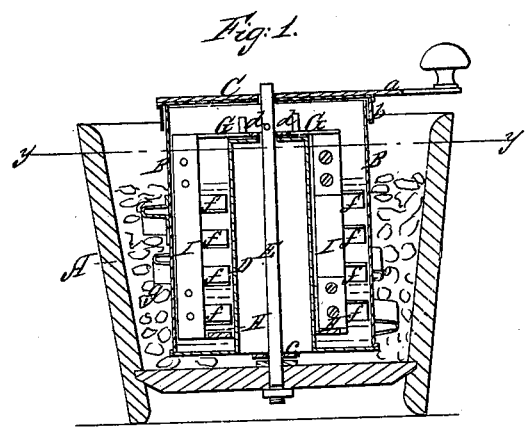
Figure 1 is a central vertical section of my invention, taken on the plane of the line $x\,x$, fig. 2.
Figure 2:
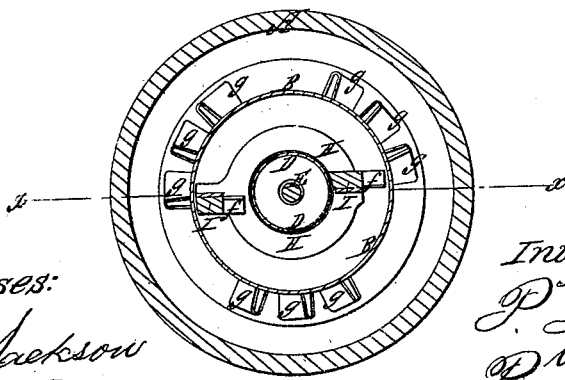
Figure 2 is a transverse section taken on the line $y\,y$, fig. 1.

Our invention consists, first, in the combination with the revolving freezing-cylinder of a hollow central tube, which surrounds the post on which the cylinder revolves, and which is open at the bottom, whereby the cream is more expeditiously frozen; second, in connecting the lid of the revolving cylinder and the crank together, so as to be in one piece.

A designates the tub or box in which the revolving cylinder is arranged. This tub may be of any desired shape and size, but it is preferred to have it larger at the top than at the bottom, so that the ice may be worked from the bottom toward the top. B is the revolving cylinder; this is open at its top, and is provided with a cover, C, having attached to it a crank, $a$, for revolving the cylinder; a pin, $b$, connected to the cover, enters a socket on the side of the cylinder, so as to hold the cover and prevent it revolving on the top of the cylinder. D is a hollow tube, open at the bottom; this surrounds a pivot-rod, E. A cross-piece, C, at the bottom of the tube, serves to steady the cylinder in its revolution. Upon the top of this tube D there is a plate, G, having two pins, $d\,d$, rising from it; one of these serves, in connection with an eye in a bolt, $e$, to hold the plate G, the said pin passing through a hole made in the pivot-rod E. This plate G has a lug or arm extending from two opposite sides, and to these arms as well as to a collar, H, surrounding the tube near its bottom, are two upright strips, I I. To each strip, but on alternate sides, are secured lifting-plates, $f\,f$, which are inclined upward. The arms and lifting-plates are held rigid, and the cylinder B, containing the cream, is revolved around it; hence these lifting-plates serve to throw the frozen cream from the bottom toward the top of the cylinder as fast as frozen, and this expedites the freezing of the whole mass to a great extent, and they also serve to scrape from the sides of the cylinder. On the outside of the cylinder B there are secured a number of loops, $g$, which are inclined upward. When revolving the cylinder these not only stir the ice, but serve as conductors directing cold air up from the bottom of the tub to the top around the sides of the cylinders.

Having thus described our invention, we claim as new, and desire to secure by Letters Patent—

1. The hollow tube D, open at the bottom, and surrounding the pivot-rod E, constructed as described, operating with the revolving cylinder B, in combination with plate G, pins $d$, and strips I, to which the upwardly inclined lifting-plates $f\,f$, are secured, all substantially as described for the purpose specified.

2. We claim the cover C, and crank $a$, connected together substantially as and for the purpose specified.

The above specification of our invention signed by us this 10th day of July, 1866.

PHILIP N. WOLISTON,
ALFRED CAVILEER,
WILLIAM McCUDDY.

Witnesses:
REUBEN MILLER,
J. CHRISTIE.